June 19, 1951

J. G. RODRIQUEZ
FOOD COOKER 2,557,467

Filed June 10, 1949

Inventor
J. G. Rodriquez
By
ATTORNEYS

June 19, 1951

J. G. RODRIQUEZ
FOOD COOKER 2,557,467

Filed June 10, 1949

Inventor

J. G. Rodriquez

By

Webster & Webster

ATTORNEYS

June 19, 1951   J. G. RODRIQUEZ   2,557,467
FOOD COOKER

Filed June 10, 1949   3 Sheets-Sheet 3

Inventor
J. G. Rodriquez
ATTORNEYS

Patented June 19, 1951

2,557,467

UNITED STATES PATENT OFFICE 2,557,467

FOOD COOKER

John G. Rodriquez, Porterville, Calif.

Application June 10, 1949, Serial No. 98,227

10 Claims. (Cl. 99—403)

This invention is directed to, and it is an object to provide, a food cooker of novel construction and operation adapted especially for, but not limited to, cooking of the Mexican type food known as tacos.

Tacos are relatively thin corn pancakes preformed from a relatively dry mix, then folded into a V shape, and cooked in deep fat. The V shape is essential to this food product, for the reason that after cooking cheese, relish, or other ingredients are placed between the halves of the pancake for serving and eating.

It is therefore an important object of this invention to provide a cooker adapted to cook preformed tacos in holding units which confine the tacos in said V shape during the entire cooking period, thus readily and effectively maintaining the desired configuration for subsequent introduction of the filling ingredients.

Another object of the invention is to provide a food cooker, for the purpose described, wherein each holding unit—of which there are several in the present embodiment—is of novel design, including circular but V-shaped inner and outer holding plates nested one within the other in symmetrical, adjacent but spaced apart cooperative relation for reception of a taco therebetween.

A further object of the invention is to provide a food cooker, as in the preceding paragraph, wherein each holding unit is arranged with one holding plate relatively fixed and the other holding plate mounted for opening and closing movement relative thereto to permit tacos to be placed in or removed from the unit; each unit being normally latched against opening, and mounted for motion between a position in a vessel of cooking fat to a position thereabove for manual access.

An additional object of the invention is to provide a food cooker, for the purpose described, which includes a member disposed above the vessel of cooking fat for rotation about a longitudinal axis; there being a plurality of food cooking units mounted on the rotary member in a manner such that certain ones are in the cooking fat in the vessel while others are thereabove for removal of cooked tacos and placement of uncooked ones. The cooker thus has a relatively large capacity.

It is also an object of the invention to provide a food cooker designed for ease and economy of manufacture, and for ready and convenient use.

A further object of the invention is to provide a practical and reliable food cooker, and one which will be exceedingly effective for the purpose for which it designed.

These objects are accomplished by means of such structure and relative arrangement of parts as will fully appear by a perusal of the following specification and claims.

Figure 1:
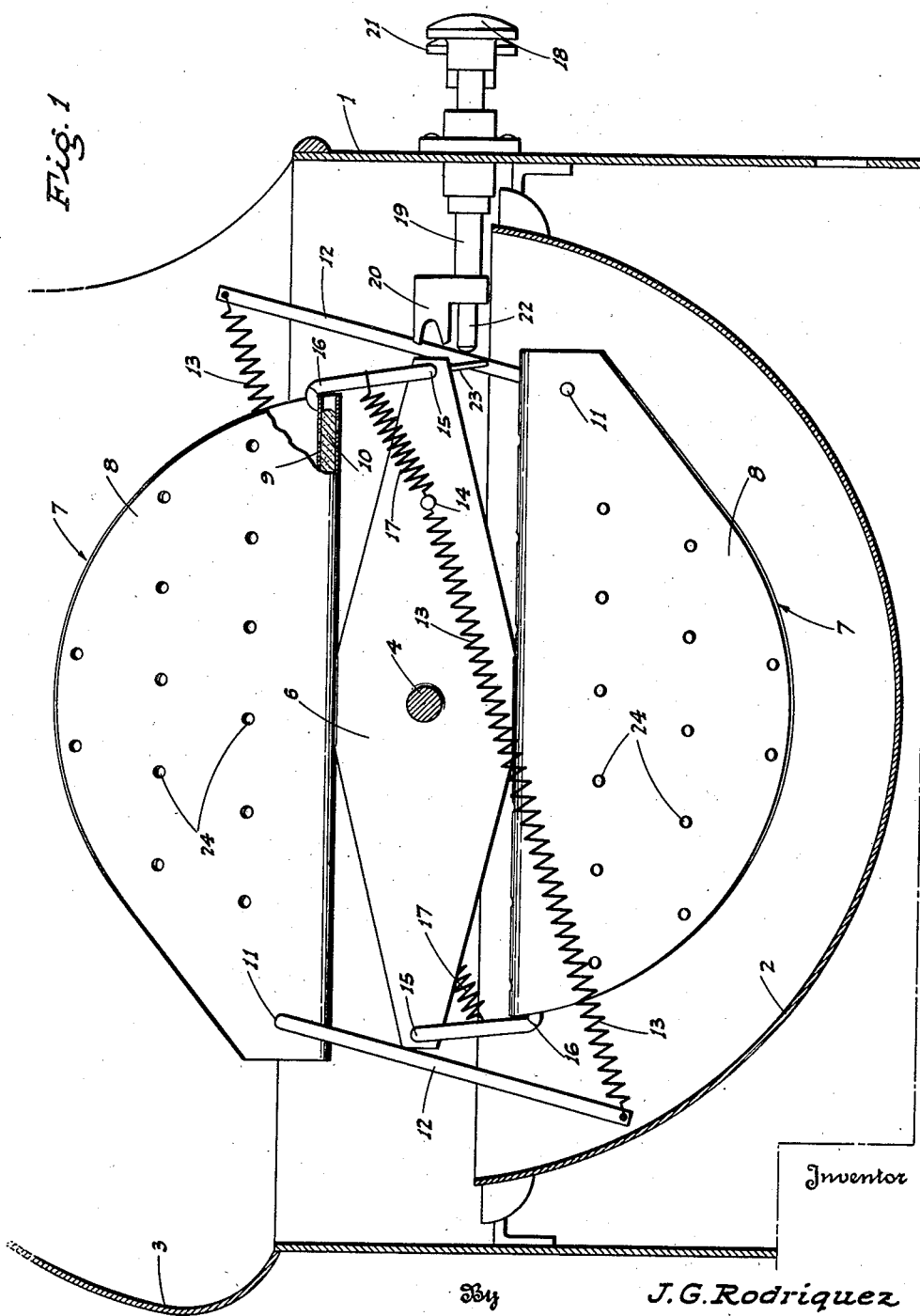
Fig. 1 is an end view of the food cooker, with all of the food holding units in closed position.

Referring now more particularly to the characters of reference on the drawings, the novel food cooker comprises an open top, exterior housing 1 which supports an open top cooking vessel 2 therein; the cooking vessel being adapted to hold deep fat or similar cooking material heated by suitable means (not shown).

If desired, a hood 3, open at the front, may be mounted in connection with the housing 1 in overhanging relation to the same.

A horizontal cross shaft 4 is journaled in connection with the housing 1 and extends above the cooking vessel 2, and at one end such cross shaft is fitted, exteriorly of the housing 1, with a hand crank 5.

A pair of spaced mounting plates 6 are fixed on, and project radially in opposite directions from, the cross shaft 4; such mounting plates 6 normally being horizontal and extending front to rear with respect to the housing 1.

Each mounting plate 6 is fixed, at opposite sides—i. e., above and below the cross shaft 4—with a vertical, outwardly projecting food holding unit, indicated generally at 7. In other words, when the mounting plates 6 are in their normal horizontal position one of the related food holding units 7 depends into the cooking vessel 2 for cooking of the food held in such unit in the manner hereinafter described. At the same time the other related food holding unit projects upwardly for removal of the food already cooked, and placement of uncooked food for subsequent cooking. Thus, rotation of the cross shaft 4 by the crank 5 a half turn at a time alternately disposes the food holding units 7 on each mounting plate 6 in a dependent cooking position and an upwardly projecting position for manual access.

Each food holding unit 7 comprises a V-shaped outer holding plate 8 affixed at the bend to the adjacent holding plate 6, and an inner V-shaped holding plate 9 nested in such outer plate 8 in adjacent but spaced cooperative relation for the reception of a taco 10 therebetween for cooking.

Figure 2:
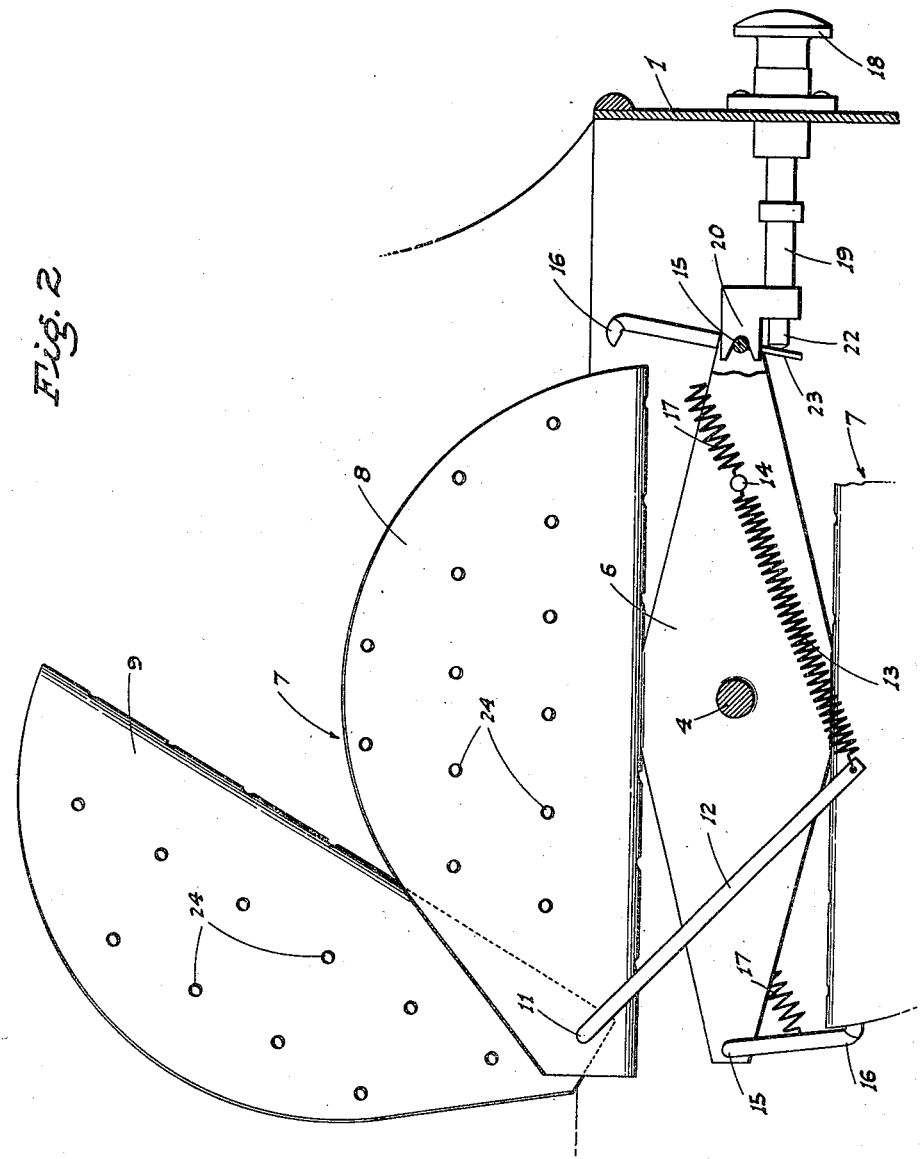
Fig. 2 is a fragmentary end view showing the open position of the uppermost food holding units.
Figure 3:
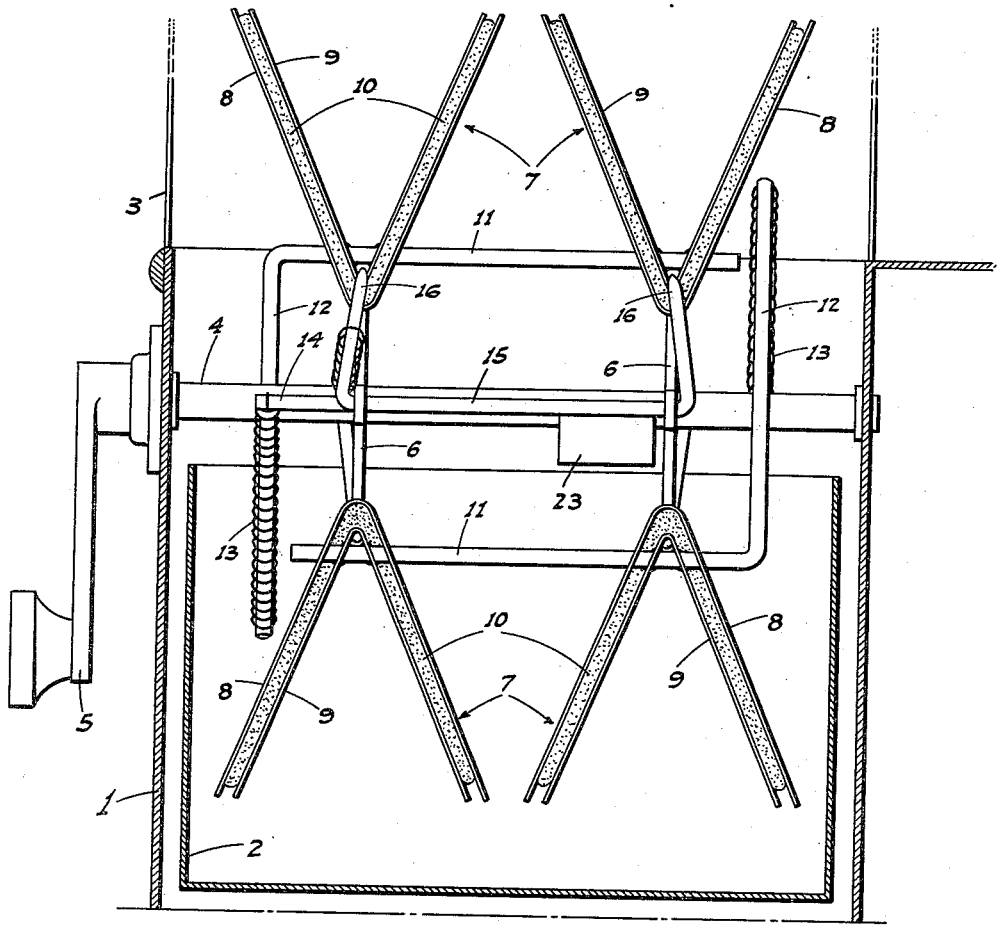
Fig. 3 is a front elevation of the food cooker; the supporting housing and the cooking vessel being in section, and all of the food holding units being in closed position.
Figure 4:
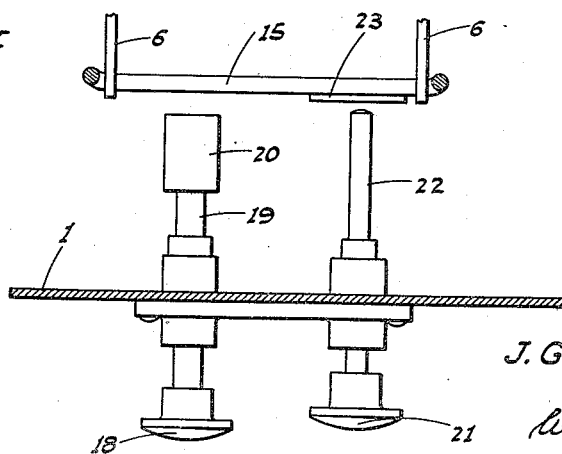
Fig. 4 is a fragmentary plan view of the securing and release assembly for the food holding units.

Each V-shaped inner plate 9 is mounted for swinging between a nested closed position, as in Figs. 1 and 3, to an outwardly swung open position, as in Fig. 2, by means of the following pivotal arrangement:

A transverse pivot rod 11 extends through the corresponding ends of each pair of food holding units 7 which are disposed on the same side of the cross shaft 4; such pivot rod being turnable in the fixed plates 8 but rigidly secured to the inner, swingable plates 9 whereby upon limited rotation of each pivot rod 11, the attached inner plates 9 may be swung to their open position, as in Fig. 2.

The pivot rods 11 of the aforesaid pairs of food holding units 7 are disposed at opposite ends of said pairs so that when each pair is uppermost its rod is to the rear with respect to the front of the housing 1, for the purpose hereinafter described.

At one end each transverse pivot rod 11 is formed with a radial lever 12 which extends inwardly generally in the direction of the cross shaft 4, and a tension spring 13 connects between the free end of each radial lever 12 and an anchor point 14 on the adjacent mounting plate 6; the arrangement being such that each tension spring 13 tends to swing the related inner plates 9 to an open position, as in Fig. 2. However, the inner plates 9 are normally maintained in a closed position by means of releasable latching mechanism, as follows:

A cross rod 15 extends between the pair of mounting plates 6 at each end thereof, and each cross rod includes a pair of generally radial hooks 16 which extend toward, and are adapted to cooperatively engage with, the free end of the corresponding inner plates 9 of one pair of the food holding units 7, in the manner clearly shown in Figs. 1 and 3.

One hook 16 of each pair is connected to a tension spring 17 which leads to the adjacent anchor point 14, whereby each pair of said hooks 16 are normally urged toward and into holding engagement with the corresponding inner plates 9 in a manner which prevents the related tension spring 13 from swinging said inner plates to open position.

After a pair of tacos 10 have been cooked in the vessel 2 in the depending pair of food holding units 7, the crank 5 is turned a half turn, swinging said pair of food holding units to the upwardly projecting, manually accessible position. The operator then depresses a push knob 18 at the front of the housing 1, which urges a plunger 19 inwardly to an extent that a fork 20 on the inner end of such plunger straddles the adjacent cross rod 15, holding the entire rotary assembly against turning motion.

At the same time another push knob 21, at the front of the housing 1 adjacent the knob 18, is depressed, urging a plunger 22 inwardly a distance to engage and swing a trigger plate 23 depending from the adjacent cross rod 15. With such swinging of the trigger plate 23, the corresponding cross rod 15 is part-turned in a direction sufficient to withdraw the corresponding hooks 16 from the inner plates 9 of the uppermost food holding units 7. When this occurs such inner plates 9 spring upwardly to open position, permitting of easy manual removal of the cooked V-shaped taco from each of said holding units.

Thereafter, uncooked, pliable tacos of generally pancake shape are placed in the open food holding units 7, and the inner plates 9 are closed and latched; such latching resulting automatically upon release of the push knob 21, followed by manual swinging to closed position of said inner plates.

It will be recognized from the above that pairs of tacos can be cooked readily and conveniently in the described food cooker; the food holding units 7 movable between their alternate positions lending a great advantage in this regard.

As the plungers 19 and 22 are normally retracted, the assembly of the food holding units 7 on the horizontal cross shaft 4 can normally be rotated, without obstruction, to alternately dispose the cross rods 15 in a forward position for cooperative engagement by the fork 20 and plunger 22, for the purpose described.

The outer and inner plates 8 and 9 of each food holding unit 7 are perforate, as at 24, to permit the heated deep fat in the cooking vessel 2 to gain access to the tacos held in such units.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a food cooker comprising an open top cooking vessel, a support for the cooking vessel, a member above the cooking vessel rotatable about a longitudinal axis and mounted on the support, a food holding unit mounted on and projecting outward from the member for swinging, upon rotation of the latter, between a cooking position in the vessel and a manually accessible position thereabove, and means to rotate the member; the food holding unit including a pair of normally nested but separable V-shaped plates, and releasable latch means between said plates.

2. In a food cooker, as in claim 1, including manually actuated means on the support, normally clear of the rotary member and holding unit, operative to engage and release said latch means.

3. In a food cooker comprising an open top cooking vessel, a support for the cooking vessel, a horizontal shaft extending above the vessel rotatably journaled on the support, a food holding unit secured in connection with and projecting outward from the shaft for motion between a position in the vessel to a position clear thereof, said unit including a pair of V-shaped plates in normally nested but spaced symmetrical relation, one plate being fixed relative to the shaft and the other plate being swingable to a relatively separated position with respect to said one plate, releasable latch means securing the V-shaped plates in said normally nested relation, and means to rotate the shaft.

4. In a food cooker comprising an open top cooking vessel, a support for the cooking vessel, a horizontal shaft extending above the vessel rotatably journaled on the support, a mounting member fixed on and radiating in opposite directions from the shaft, a V-shaped food holding plate fixed at the bottom to and extending along the mounting member, another V-shaped food holding plate normally nested in said one plate in symmetrical but spaced relation, means pivotally mounting said other plate for swinging motion to an open position substantially out of said one plate, releasable latch means normally securing said plates in said nested relation for food engagement therebetween, and means to rotate the shaft to swing the nested plates between a position in the cooking vessel to a position for manual access thereabove.

5. In a food cooker comprising an open top cooking vessel, a support for the cooking vessel, a horizontal shaft extending above the vessel rotatably journaled on the support, a mounting member fixed on and radiating in opposite directions from the shaft, a V-shaped food holding plate fixed at the bottom to and extending along the mounting member, another V-shaped food holding plate normally nested in said one plate in symmetrical but spaced relation, a cross rod adjacent the ends of the plates pivotally mounting said other plate for swinging motion to an open position substantially out of said one plate, a radial lever on the rod, a tension spring connected between the lever and mounting member in a manner tending to swing said other plate to open position, releasable latch means operative to prevent such motion of the other plate, and means to rotate the shaft to swing the nested plates between a position in the cooking vessel to a position for manual access thereabove.

6. A structure, as in claim 5, in which said latch means includes a latch member releasably engaging said other plate, and manually actuated latch member release mechanism mounted on the support normally clear of the food holding plates but movable to engage and release said latch member when the plates are in said position for manual access.

7. In a food cooker comprising an open top cooking vessel, a support for the cooking vessel, a horizontal shaft extending above the vessel rotatably journaled on the support, food holding units mounted on and projecting in opposite directions from the rotatable member for swinging movement between a depending position in the vessel and an upwardly projecting position for manual access, hand means to rotate the shaft to move the food holding units between said positions, and hand actuated means on the support normally clear of but adapted to advance into engagement with the assembly of said units to hold the latter against rotation; the food holding units being two-part, normally closed, but releasable to an open position, latch means normally maintaining each unit closed, and other hand actuated means on the support normally clear of said assembly but adapted to advance and release the latch means of the unit then in upwardly projecting position.

8. In a food cooker comprising an open top cooking vessel, a support for the vessel, a horizontal cross shaft journaled on the support and extending above the vessel, means to rotate the shaft, a pair of spaced mounting plates fixed radially on and projecting lengthwise in opposite directions from the cross shaft, a pair of food holding units mounted lengthwise on and projecting outwardly from the mounting plates on each side of the cross shaft, each food holding unit including a pair of normally nested V-shaped holding plates in adjacent but spaced symmetrically cooperating relation, the outer plate of each unit being fixed on the adjacent mounting plate, the inner plate of each unit being pivoted adjacent one end to the corresponding outer plate for swinging to an open position, a spring tending to so swing each inner plate, and releasable latch means cooperating with each inner plate to prevent such swinging to open position.

9. In a food cooker comprising an open top cooking vessel, a support for the vessel, a horizontal cross shaft journaled on the support and extending above the vessel, means to rotate the shaft, a pair of spaced mounting plates fixed radially on and projecting lengthwise in opposite directions from the cross shaft, a pair of food holding units mounted lengthwise on and projecting outwardly from the mounting plates on each side of the cross shaft, each food holding unit including a pair of normally nested V-shaped holding plates in adjacent but spaced symmetrically cooperating relation, the outer plate of each unit being fixed on the adjacent mounting plate, the inner plate of each unit being pivoted adjacent one end to the corresponding outer plate for swinging to an open position, a spring tending to so swing each inner plate, and releasable latch means cooperating with each inner plate to prevent such swinging to open position; the inner plates of the pair of food holding units on one side of the cross shaft being pivoted adjacent one end and latched adjacent the other, and the inner plates of the pair of food holding units on the other side of the cross shaft being oppositely pivoted and latched, and manually actuated means on the support normally clear of but adapted to advance, engage, and release the latch means corresponding to the inner plates of each pair of food holding units when said pair is disposed above the shaft and the other pair depends into the cooking vessel.

10. A structure, as in claim 9, including manually actuated means on the support normally clear of but adapted to advance, engage, and prevent rotation of the assembly of the food cooking units.

JOHN G. RODRIQUEZ.

REFERENCES CITED

The following references are of record in the file of this patent:

UNITED STATES PATENTS

| Number | Name | Date |
| --- | --- | --- |
| 1,599,805 | Barsam | Sept. 14, 1926 |
| 1,630,676 | Smith | May 31, 1927 |
| 1,993,609 | Kennedy | Mar. 5, 1935 |
| 2,447,039 | Stabler | Aug. 17, 1948 |